United States Patent
den Otter (10) Patent No.: US 9,417,072 B2
(45) Date of Patent: Aug. 16, 2016

(54) NAVIGATION DEVICE HAVING DEAD RECKONING NAVIGATION FUNCTIONALITY AND METHOD THEREOF

(75) Inventor: Matthijs Willem den Otter, Veldhoven (NL)

(73) Assignee: TomTom International B.V., Amsterdam (NL)

( * ) Notice: Subject to any disclaimer, the term of this patent is extended or adjusted under 35 U.S.C. 154(b) by 0 days.

(21) Appl. No.: 14/130,963

(22) PCT Filed: Jul. 5, 2012

(86) PCT No.: PCT/EP2012/063170
§ 371 (c)(1),
(2), (4) Date: Mar. 18, 2014

(87) PCT Pub. No.: WO2013/004791
PCT Pub. Date: Jan. 10, 2013

(65) Prior Publication Data
US 2014/0297177 A1 Oct. 2, 2014

(30) Foreign Application Priority Data
Jul. 5, 2011 (GB) .................................. 1111455.0

(51) Int. Cl.
*G01C 21/00* (2006.01)
*G01C 21/12* (2006.01)
*G01C 21/06* (2006.01)
*G01C 21/16* (2006.01)

(52) U.S. Cl.
CPC ................ *G01C 21/12* (2013.01); *G01C 21/06* (2013.01); *G01C 21/16* (2013.01)

(58) Field of Classification Search
CPC ........ G01C 21/06; G01C 21/12; G01C 21/16; G01C 21/165; G01C 21/30; G01C 21/28; G01C 21/26; G01C 21/20; G01C 21/005; G01C 22/006; G01C 21/00; G01C 21/265; G01C 21/32; G01C 21/3438; G01C 21/36; A63B 2024/0025; A63B 2071/0691; A63B 2220/13; A63B 2220/20
USPC .......................... 701/400–541; 340/988–996
See application file for complete search history.

(56) References Cited

U.S. PATENT DOCUMENTS 5,752,220 A * 5/1998 Geier ..................... G01C 21/12
235/95 R
6,801,855 B1 * 10/2004 Walters ................... G01S 19/49
340/995.1

(Continued)

FOREIGN PATENT DOCUMENTS

KR      20040044647 A    5/2004

OTHER PUBLICATIONS

Search Report issued on Oct. 7, 2011 for United Kingdom Application No. GB1111455.0.

(Continued)

*Primary Examiner* — Muhammad Shafi (57) ABSTRACT

Embodiments of the present invention provide a method of determining a heading of travel of a navigation device, comprising determining a reference heading for a roadway system and determining a current heading of navigation device travel, wherein the current heading is determined as an integer multiple of a predetermined lock angle in combination with the reference heading.

18 Claims, 5 Drawing Sheets

(56) References Cited

U.S. PATENT DOCUMENTS

2010/0076681 A1 3/2010 Colley
2010/0256939 A1* 10/2010 Borenstein ............ G01C 21/06
　　　　　　　　　　　　　　　　　　　　702/96

OTHER PUBLICATIONS

International Search Report issued on Oct. 5, 2012 for International Application No. PCT/EP2012/063170.

* cited by examiner

NAVIGATION DEVICE HAVING DEAD RECKONING NAVIGATION FUNCTIONALITY AND METHOD THEREOF

CROSS-REFERENCES TO RELATED APPLICATIONS

This application is the National Stage of International Application No. PCT/EP2012/063170, filed on Jul. 5, 2012, and designating the United States. The application claims the benefit of United Kingdom Patent Application No. 1111455.0 filed Jul. 5, 2011. The entire content of these applications is incorporated herein by reference.

FIELD OF THE INVENTION

This invention relates to mobile devices, and preferably navigation systems. Illustrative embodiments of the invention relate to portable navigation devices (so-called PNDs), in particular PNDs that include Global Positioning System (GPS) signal reception and processing functionality. Other embodiments relate, more generally, to any type of mobile processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the drivers own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the Go Live 1000 model manufactured and supplied by TomTom International B.V., provide a reliable means for enabling users to navigate from one position to another.

Particular problems arise with utilising navigation devices in areas of low navigation signal reception i.e. where a received signal strength of received GPS signals is low or non-existent. Areas where problems are known to occur are covered vehicle areas, such as covered or underground parking structures. Such parking structures are sometimes known as multi-storey car parks. When in such areas of low navigation signal reception, a vehicle carrying a navigation device may travel a significant distance around an internal road system of the car park. However, the layout of the internal road system is often poorly characterised in map data. In other words, map data often does not contain road layout information for car parks. In areas of low navigation signal reception, the navigation device may attempt to navigate, i.e. to maintain knowledge of its location, using, at least in part, information received from other sources, such as accelerometers or gyroscopes. However, small mis-calibrations or inaccuracies of these devices can accumulate with the significant distance travelled, leading to a large error in the estimated position of the navigation device. When a vehicle carrying the navigation device exits such a car park, if the location of the navigation device at the exit is inaccurate, a period of time may be required for the navigation device to ascertain its position from received navigation signals.

The present invention provides an improved system and method for dead reckoning navigation.

SUMMARY OF THE INVENTION

The present invention provides a navigation device, comprising a dead reckoning navigation (DRN) module arranged to determine a reference heading for a roadway system and to select a current heading of navigation device travel as an integer multiple of a predetermined lock angle in combination with the reference heading.

The present invention also provides a method of determining a heading of travel of a navigation device, comprising determining a reference heading for a roadway system and determining a current heading of navigation device travel, wherein the current heading is determined as an integer multiple of a predetermined lock angle in combination with the reference heading.

The present invention also provides computer software operable, when executed on a mobile system as described herein above, to cause a processor to perform a method of determining a heading of travel of a navigation device, comprising determining a reference heading for a roadway system determining a current heading of navigation device travel, wherein the current heading is determined as an integer multiple of a predetermined lock angle in combination with the reference heading.

BRIEF DESCRIPTION OF THE DRAWINGS

Various embodiments of the present invention will now be described with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of mobile processing device that is configured to execute navigation software so as to provide route planning and navigation functionality. It follows therefore that in the context of the present application, a navigation device is intended to include (without limitation) any type of mobile route planning and navigation device, irrespective of whether that device is embodied as a PND, a navigation device built into a vehicle, or a mobile telephone or portable digital assistant (PDA)) executing route planning and navigation software.

Figure 1:
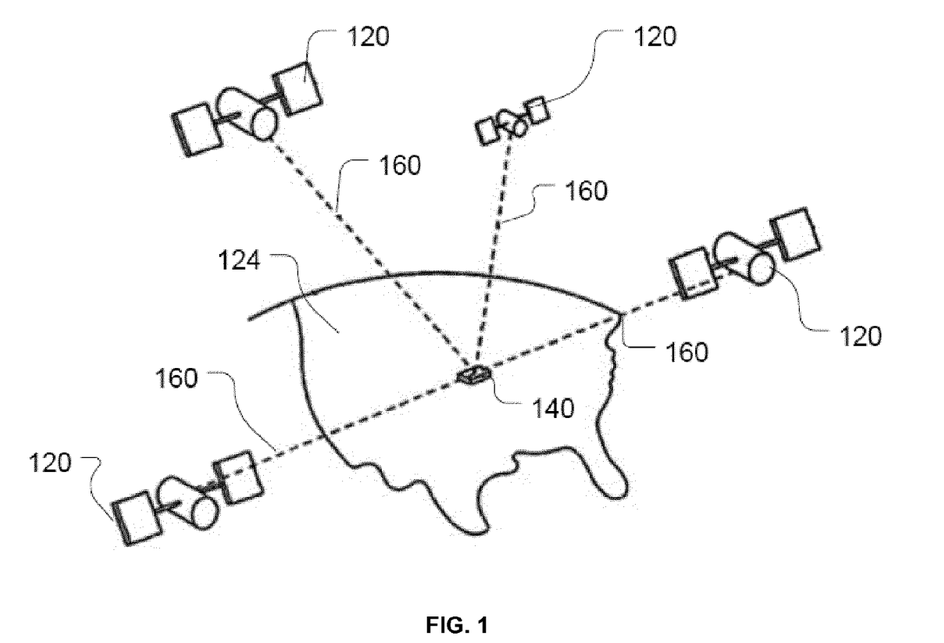
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
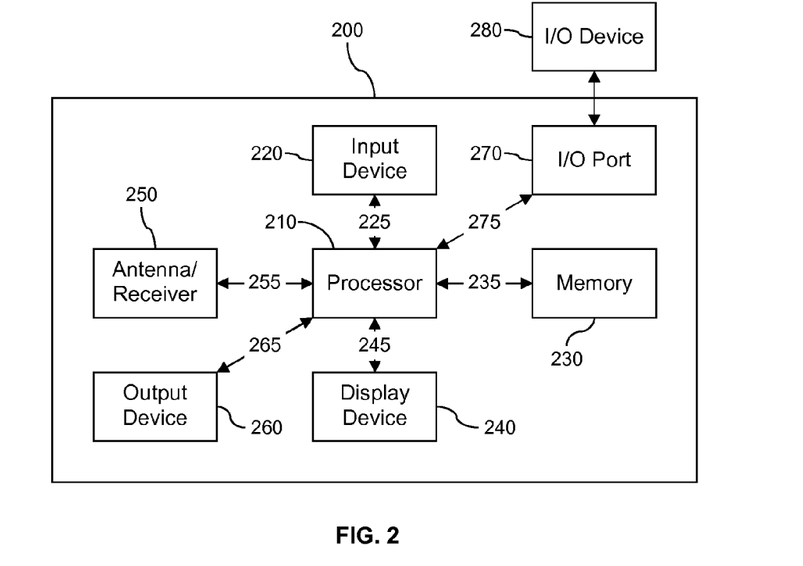
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
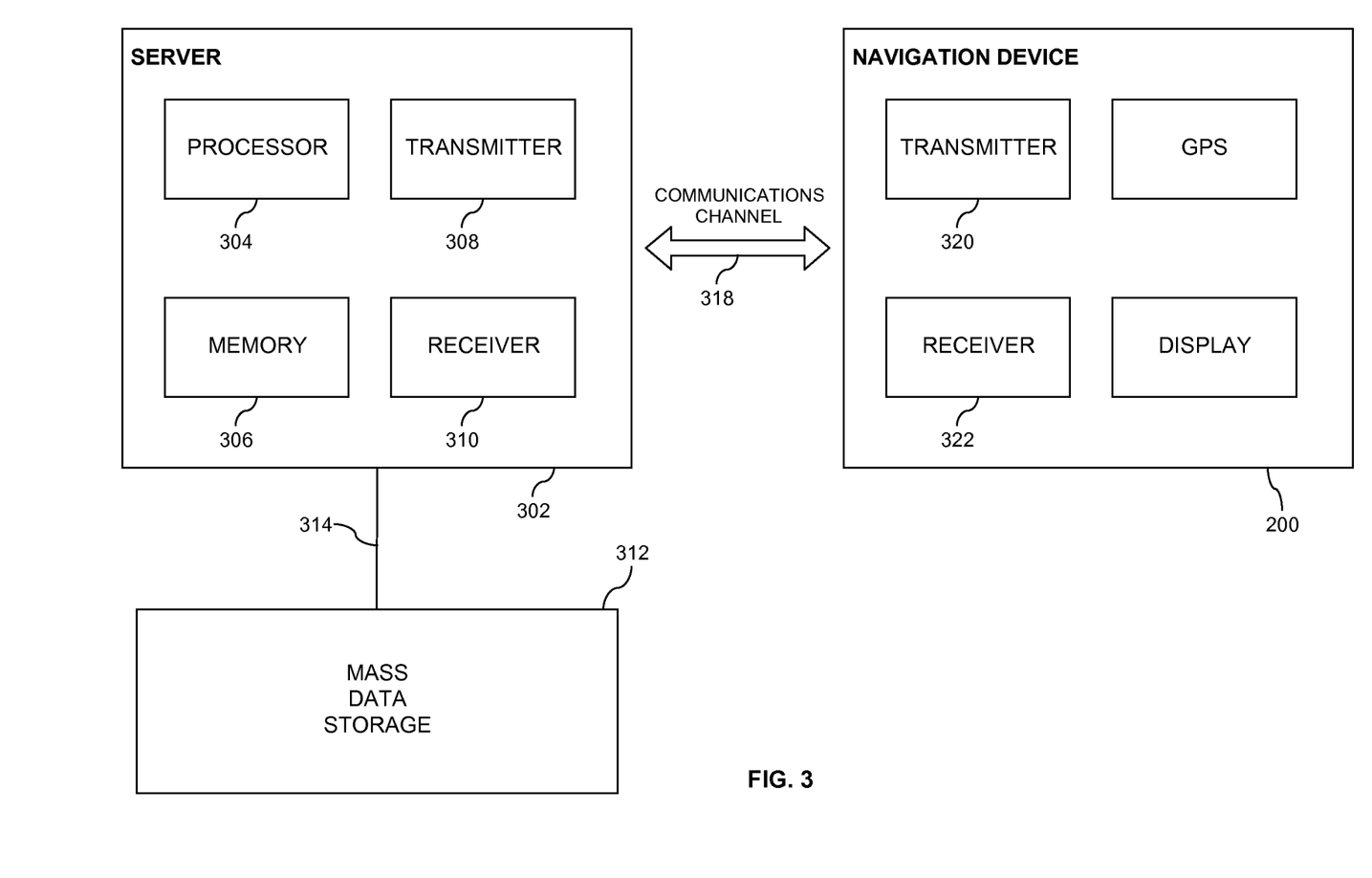
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4:
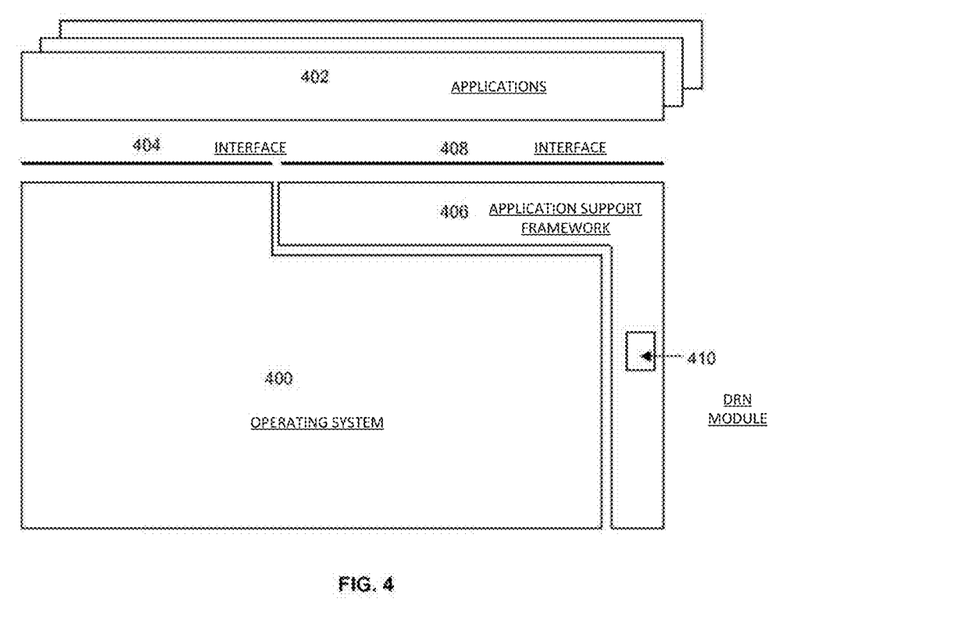
FIG. 4 shows the high level system architecture of a preferred embodiment of the mobile navigation device.

FIG. 4 shows the high level system architecture of components on a mobile navigation device 200 according to a preferred embodiment of the present invention. The navigation device 200 includes an operating system 400, one or more applications 402 and an interface between the operating system and the applications 404. An application support framework 406 is provided for supporting the applications 402 and which has access to the various libraries and drivers of the operating system 400. An interface 408 is provided between the support framework 406 and the applications 402. In the preferred embodiment, a dead reckoning navigation (DRN) module 410 is provided within the application support framework 406.

Figure 5:
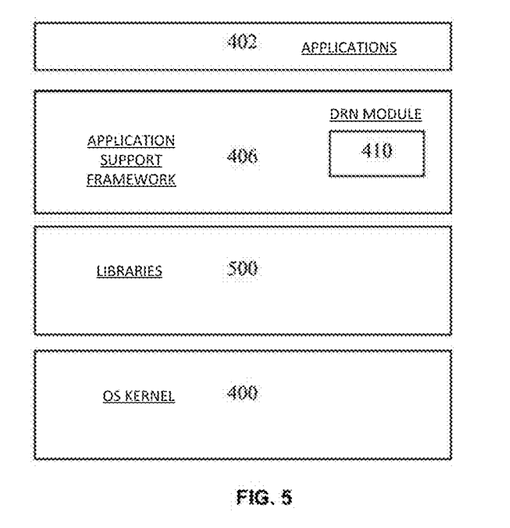
FIG. 5 shows a preferred embodiment of a software stack on a preferred mobile navigation device.

FIG. 5 shows a software stack that may be used in a preferred embodiment of the mobile navigation device 200. The stack comprises an OS kernel 400. This may include display drivers, keypad drivers, camera drivers, power management, audio drivers, etc. The stack also comprises libraries 500, e.g. including graphics libraries, runtime libraries etc. The stack also comprises an application framework 406, which includes the DRN module 410 and may also include, for example, a window manager, resource manger notification manger, a telephony manager, etc. The stack also comprises the one or more applications 402.

Some embodiments of the invention utilise two reference distances of travel: a long distance and a short distance. The long distance is intended to be longer than a trajectory in a right-angle or 90° turn of a vehicle carrying the navigation device 200, or into which the navigation device 200 is built. The long distance may be determined appropriate for the vehicle, for example set in a profile corresponding to the vehicle, or set by a manufacturer of the vehicle. For the purposes of explanation, a long distance of 20 m will be discussed. However, it will be realised that this is merely exemplary and other distances may be used for the long distance. The short distance is relatively shorter than the long distance. The short distance is preferably an integer division of the long distance, although embodiments may be envisaged in which the short distance is not an integer division of the long distance. The short distance is shorter than required by the vehicle to make a substantially right-angle or 90° turn, but long enough such that a quantifiable angular or heading change of the vehicle may occur whilst turning during the short distance of travel. The short distance may be selected such that the vehicle is able to make a turn of around 35° whilst travelling the short distance. The present invention will be explained with reference to a short distance of 5 m, which is one quarter of the long distance. However, it will be realised that other short distances may be utilised, such as 4 m or 10 m.

Some embodiments of the present invention also utilise two reference angles: a lock angle and a threshold angle. The lock angle is used, in embodiments of the invention, to select heading changes of a direction of travel of the navigation device 200 to integer multiples of the lock angle. The lock angle is preferably an integer division of 90°. Preferred lock angles are 30° and 45°, although it will be realised that other lock angles may be selected. A lock angle of 90° may be used in some embodiments of the invention. Embodiments of the present invention will be explained with reference to an exemplary lock angle of 30°. The threshold angle is an angle utilised as a threshold for setting a reference direction of travel heading, as will be explained. The threshold angle is utilised in determining a reference heading and for determining when the navigation device 200 is making a turn, as will be explained. Although embodiments of the invention will be explained with reference to a single threshold angle, it will be realised that two or more, different, threshold angles may be used for respective purposes. A single exemplary threshold angle of 5° will be utilised, although it will be realised that other threshold angles may be chosen.

Embodiments of the present invention utilise angular information relating to a heading of the navigation device's direction of travel which may be obtained from one or more sources. The sources of angular information may be solely internal to the navigation device 200, from a vehicle in which the navigation device is mounted, or is built into, or a combination of both. The angular information may relate to a heading change, rather than an absolute heading. Such angular information may be obtained from a variety of sources and the present invention is not limited in this respect. A first source from which such angular information may be obtained is a gyroscope, which may either be located within the navigation device 200, especially in the case of a PND, or in the vehicle with which the navigation device is associated. An alternative source for such angular information is one or more accelerometers arranged to measure a lateral acceleration of the navigation device or vehicle. In the case of angular information obtained from sensors within the vehicle, this may be communicated to the navigation device via a wired or wireless connection. Such a connection may be via a communication system of the vehicle, such as a CAN bus, communicably coupled to the navigation device 200 or a wireless connection such as a Bluetooth connection to the navigation device 200. Alternatively or additionally, one or more vehicle sensor may be configured to measure a steering angle of the vehicle's steering wheel(s) to determine the direction of travel based thereon.

Embodiments of the invention also utilise distance information relating to a distance travelled by the navigation device 200. A distance travelled by the vehicle may be determined from similar sources as the angular information. A distance travelled by the navigation device 200 may be determined from an accelerometer(s) of either the navigation device 200 or the vehicle, wherein the accelerometer(s) is arranged to measure linear acceleration. Based on speed information previously determined from received GPS signals in combination with linear acceleration information provided from the one or more accelerometers, an estimate of the navigation device's speed may be maintained and a distance travelled by the vehicle estimated based thereon, e.g. in combination with time information. However, another potentially more accurate source of information about the distance travelled by the navigation device may be based on one or more sensors of the vehicle which are arranged to monitor wheel rotation of the vehicle. Such rotational sensors are often arranged to provide an oscillating signal which varies between first and second output levels e.g. high and low, often known as "ticks", relating to a predetermined rotation of a vehicle wheel, such as $\frac{1}{96}^{th}$ of a wheel revolution. Such wheel rotation sensors are frequently used by the vehicle's ABS and/or traction control system(s). Often a vehicle manufacturer will configure the ticks to indicate a predetermined distance of vehicle travel such as 0.2 m. Based on the number of ticks output by the vehicle sensor(s) the distance travelled by the vehicle can be determined by the DRN module 410. In still further embodiments, the navigation device may receive distance information from an odometer of the vehicle which indicates the distance travelled by the vehicle.

Figure 6:
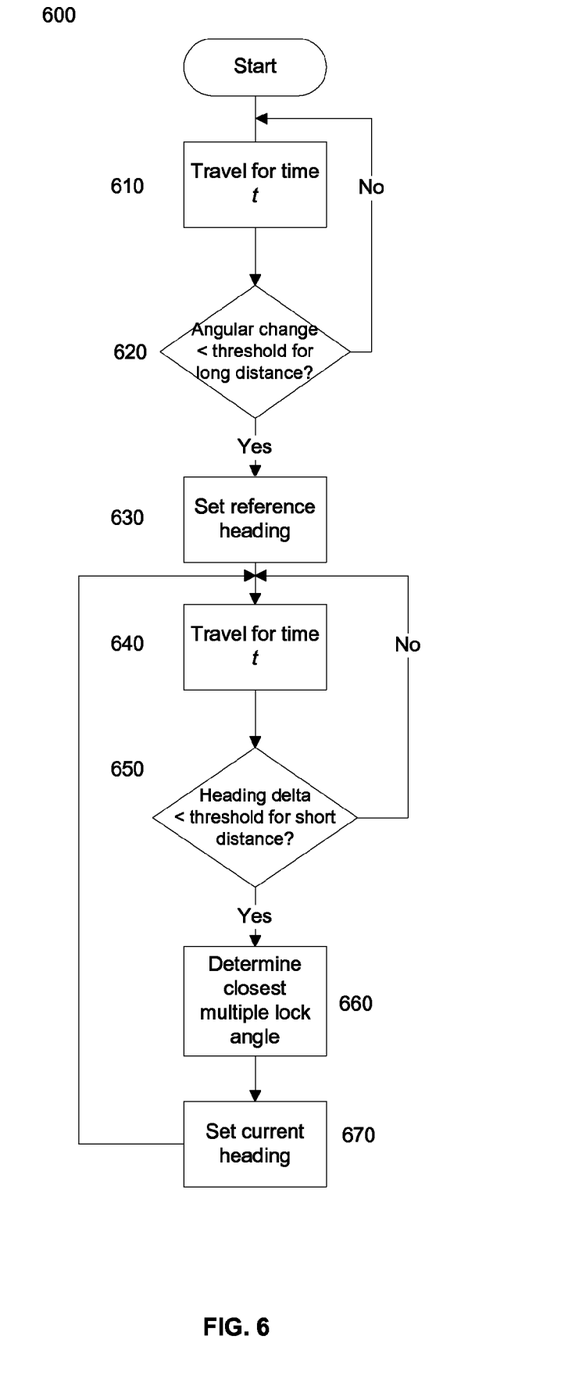
FIG. 6 illustrates a method according to an embodiment of the invention.

FIG. 6 illustrates a method 600 according to an embodiment of the invention. The method 600 may be performed by the DRN module 410 of the navigation device 200. The method 600 may be executed in response to a lack, or low signal level, of wireless navigation signals being received by the navigation device 200. Alternatively or additionally, the method 600 may be executed in response to the navigation device 200 determining that its current location corresponds to an area or structure where dead-reckoning navigation, i.e. navigation without receipt of wireless navigation signals, may be useful, such as an underground or covered vehicle parking structure. This may be determined based at least in part on map data accessible to the navigation device 200. In this sense, steps of the method, such as steps 610-630 to determine a reference heading as will be explained may be performed prior to entering an area or structure where dead reckoning navigation may be useful, such as a parking structure. These steps may be performed on a road proximal but external to the structure as it is likely that the external road will have the same orientation as an internal roadway system of the structure.

The method 600 comprises a step 610 of allowing a predetermined period t of travel to take place. The predetermined period t may be 0.2, 0.4, 0.5 or 1 second, although other values may be chosen appropriately. The time t may be selected as a relatively small period time during which sensor signals received by the DRN module 410 may be updated and thus prevents the method spinning in a loop which unnecessarily consumes resources of the navigation device 200, such as processor time. It will be realised that in some embodiments of the invention step 610 may be omitted, such as via appropriate use of interrupts to the processor.

In step 620, the DRN module 410 is arranged to determine whether a direction of travel is substantially constant for a predetermined distance which is, in some embodiments, a long distance travelled by the navigation device 200. In particular, step 620 may comprise determining whether an angular change of the direction of travel is less than the threshold angle for the long distance. For example, if the long distance is 20 m and the threshold angle is 5°, as discussed above, the DRN module 410 is arranged to determine whether the change in the direction of travel of the navigation device 200 is less than the threshold angle for the long distance in step 620. The angular change of the direction of travel may be determined according to one or more signals received by the DRN module 410, such as the output from the gyroscope of the navigation device 200.

If the heading change over the long distance is greater than the threshold angle, the method loops around back to step 610 until such time as the relatively straight long distance is encountered. Once the relatively straight long distance is encountered, the method moves to step 630.

In step 630 a reference heading is determined. The reference heading is determined based upon the direction of travel of the navigation device 200 during the long distance travelled in step 620. The heading may be determined from an internal magnetic compass of the navigation device 200. Alternatively, the heading of travel may also be determined based on a previous heading of the navigation device 200 determined from previously received navigation signals i.e. GPS signals in combination with subsequent angular change information from the navigation device 200 and/or vehicle sensors. Alternatively still, it may not be necessary to know an absolute heading of the vehicle during the long distance i.e. an actual magnetic compass heading of travel. Instead, in some embodiments, the reference heading during the long distance of step 610 may be stored as 000 i.e. 0°.

The reference heading forms a base or reference heading used by the DRN module 410 for an internal road system of the area in which the navigation device 200 is travelling, such as a car park, as discussed above. Such internal road systems are often based upon a simple road layout only featuring roads in a grid layout i.e. at 90° intervals without including gradual curves or bends. Therefore, embodiments of the invention utilise this knowledge to eliminate or at least reduce dead reckoning navigation errors by excluding small heading changes which are likely erroneous and restricting heading changes to integer multiples of the lock angle. The length of the long distance is chosen, at least in part, as being long enough to reliably determine the reference heading since it is unlikely that the navigation device will travel e.g. 20 m in, for example, a car park without travelling via the internal road system. In some embodiments, step 630 includes setting a current heading of the navigation device 200 travel to equal the reference heading. The current heading maintains the direction of travel of the navigation device (200) which, for the first execution of step 630 is the same as the reference heading. The current heading may be updated as execution of the method 600 progresses, as will be explained.

Having determined the reference heading in step 630, in step 640 the DRN module 410 allows a further predetermined period t of travel to take place. The predetermined period t may be the same as that permitted in step 610, although the predetermined period t in step 640 may be different from that in step 610 in some embodiments. As previously explained, the time t allows one or more sensors signals provided to the DRN module 410 to be updated and may, in some embodiments be omitted from the method 600.

In step 650, the heading change of the navigation device 200 is considered during each short distance travelled. The heading change may be obtained by subtracting a direction of travel for each short distance from the current heading, or directly as angular information from one or more sensor signals received by the DRN module 410. If the heading change is less than the threshold angle during the short distance, then this may indicate that the one or more sensors from which the heading angular information is obtained have drifted or are mis-calibrated. Alternatively, the small heading or angular change may indicate that the vehicle has not deviated or departed from an internal road, but has made a small direction adjustment whilst travelling along that road which does not represent an actual change in heading of the direction of travel, but is instead a small correction to the current course. If, in step 650, it is determined that the heading change is less than the threshold angle, then the method moves to step 660. Otherwise, wherein the heading change is greater than or equal to the threshold angle, the method returns to step 640. If the heading change is greater than or equal to the threshold angle this indicates that the navigation device 200 is travelling a corner i.e. that the vehicle carrying the navigation device is executing a turn, such as a 90° turn between roads. Therefore, the current heading of travel of the navigation device 200 is not updated until a straight direction of travel is resumed.

In step 660, since the direction of travel of the navigation device 200 differs from the current heading by less than the threshold angle, it is assumed that the navigation device 200 is not intentionally turning i.e. that the vehicle has not initiated or is executing a turn such as between internal roads. As noted above, internal road systems are unlikely to include turns of an arbitrary degree, being of a purpose designed layout. Therefore, a heading corresponding to a nearest multiple of the lock angle and the reference heading is determined. The heading is determined in some embodiments as:

Heading=RH+x×lockangle where Heading is the updated heading, RH is the reference heading determined in step 630, lockangle is the lock angle, such as 30°, and x is an integer. The integer x is selected such that the determined Heading best matches the indicated direction of travel i.e. there is a least difference between the determined Heading and the indicated direction of travel of the navigation device 200, such as that output by the gyroscope. Integer x is a non-zero integer selected from amongst the possible headings based on the lock angle which, in the example, are from amongst 12 angles (360/30=12) wherein the range of integers may be negative and positive representing left-hand and right-hand headings based on the reference heading, wherein it is possible to exclude consideration of one of −6 and +6 since both represent the same heading.

In step 670, the current heading is updated according to the heading determined in step 660. The method then returns to step 640. Execution of the method 600 by the DRN module 410 may end when one or more predetermined events occur, such as navigation signals being received by the navigation device 200, or the DRN module determining from map data that the location of the navigation device 200 corresponds to a location external to a parking structure etc.

Operation of the method 600 will now be described with reference to FIG. 7. It will be noted that FIG. 7 is not drawn to scale and is merely exemplary with example headings detailed below.

Figure 7:
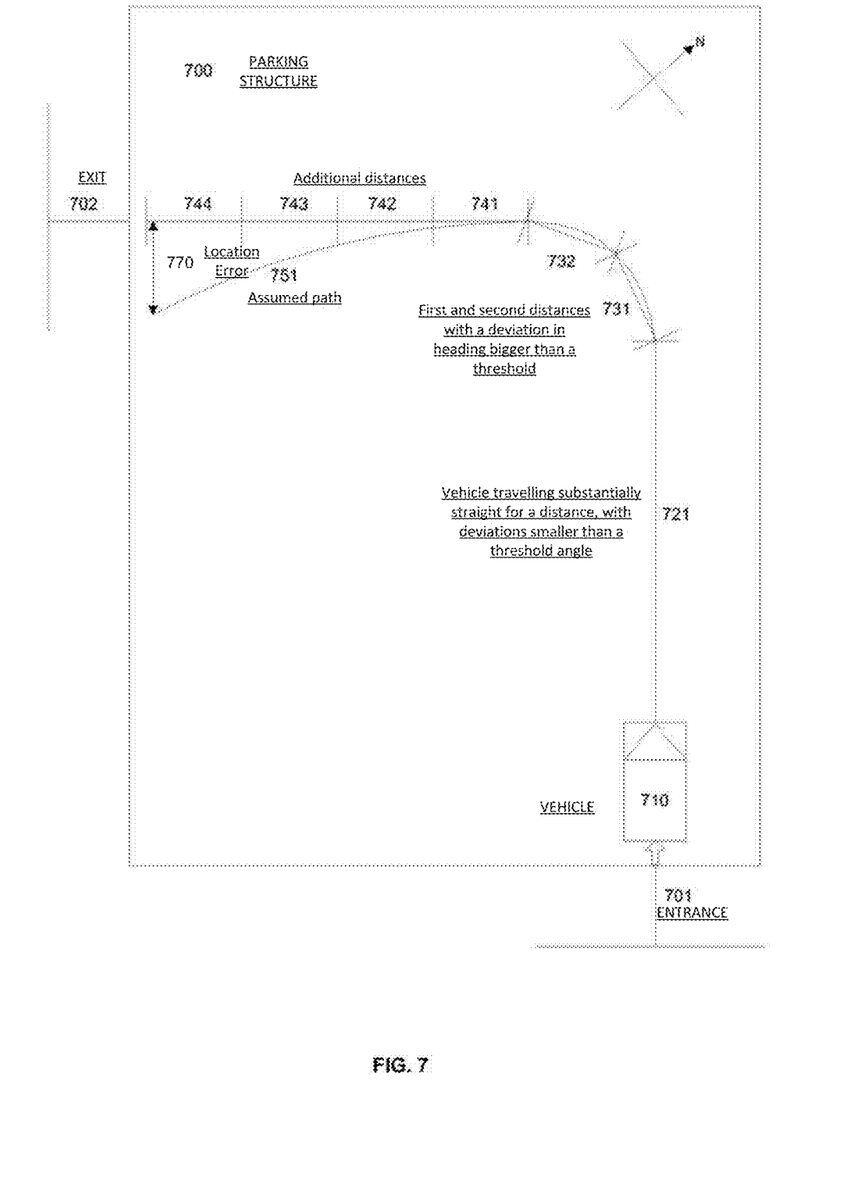
FIG. 7 schematically illustrates the operation of an embodiment of the invention.

FIG. 7 illustrates a parking structure, such as an underground, covered or multi-storey, car park accessed by an entrance road 701 and having an exit road 702. A vehicle 710 enters the structure 700 by the entrance road 701 and proceeds along an internal road. The vehicle travels substantially straight, possibly with minor deviations less than the threshold angle, for a long distance 721.

The method determines in step 620 that whilst travelling the long distance 721, the navigation device 200 experiences a heading or direction of travel change which is less than the threshold angle. Therefore, the method moves to step 630.

In step 630 the reference heading and current heading are set. In the example of FIG. 7, the reference and current heading are set to 315 (north-west) in step 630, although it is realised that this heading is merely exemplary.

As the vehicle 710 carrying the navigation device 200 travels a first short distance 731, the gyroscope, for example, of the navigation device 200 indicates that the vehicle has turned approximately −50° during the short distance 731 In step 650, the DRN module 410 determines that the heading change is not less than the threshold angle and the method loops such that it returns to step 650 via delay step 640.

Similarly, as the vehicle travels a second short distance 732, it is determined in step 650 that the heading change whilst travelling that short distance 732 is 40°, which is, again, not less than the threshold heading and therefore the method again loops back to step 640.

As can be appreciated from FIG. 7, as a result of the vehicle 710 travelling the first and second short distances 731, 732, a turn of 90° is substantially completed by the vehicle 710.

Following the completion of the 90° turn of the internal road network, the vehicle 710 proceeds in a generally straight direction toward the exit 702. However, the gyroscope of the navigation device 200, for example, indicates a heading change whilst travelling the third short distance 741 of −4, as indicated by line 751. If this erroneous direction of travel is utilised for dead-reckoning navigation the heading error may continue to accumulate, such that a direction of travel of the navigation device 200 would be assumed to follow the path 751 shown in FIG. 7, whereas the actual direction of travel of the vehicle is indicated by the line following the short distances 741-744. At a location of the exit 702 an appreciable location error 770 would exist between the incorrect path indicated by the gyroscope heading and the actual path followed by the vehicle. This error is reduced by embodiments of the present invention. In execution of step 650 during the third short distance 741, it is determined that the heading change whilst travelling that short distance 741 is less than the threshold angle and the method moves to step 660.

In step 660, a closest multiple of the lock angle is determined based upon the reference heading. The closet multiple of the lock angle is −3 which provides a new heading of 225 (225=315+(−3*30). This heading is set as the current heading in step 670. It can be appreciated that had the heading indicated by the gyroscope been followed, the path 751 would be assumed in dead reckoning calculations based thereon. In contrast, the path indicated by the current heading is that indicated by short distances 741-744. For each of the short distances 742-743, the heading changes is determined in step 650 to be less than the threshold angle and the nearest current heading is selected based on the reference heading and lock angle, which is 225 in this example. As a result a straight course is plotted to the exit 702. The method 700 may end when navigation signals are received by the navigation device 200 upon leaving the parking structure 700.

Based on the current heading the location of the vehicle 710 may be updated by the DRN module 410 utilising distance information, such as that derived from the wheel rotation of the vehicle. When the vehicle 710 leaves the exit 702, since its location is known more accurately navigation information may be output from the navigation device 200 based upon the current location.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example, the navigation device may utilise other global navigation satellite systems, such as the European Galileo system. Equally, it is not limited to satellite-based systems, but could readily function using ground-based beacons or other kind of system that enables the device to determine its geographic location.

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation device, comprising a processor, a receiver, a memory having map data and a dead reckoning navigation (DRN) module, wherein the DRN module is operable to determine when a structure has been entered, wherein the DRN module, upon the determination of entering the structure, is additionally operable to:
   obtain angular information relating to a heading of navigation device travel; and
   obtain distance information relating to a distance travelled by the navigation device, and wherein said DRN module is arranged to:
      determine a reference heading for a roadway system having a grid layout in the structure based on a direction of navigation device travel for a first distance in response to a determination that a change in heading over the first distance is less than a first threshold angle;
      set a current heading of navigation device travel as equal to the determined reference heading;
      determine a change in heading of navigation device travel over each of one or more second distances travelled by the navigation device, said second distance being less than the first distance;
      update the current heading of navigation device travel as an integer multiple of a predetermined lock angle in combination with the reference heading in response to a determination that the change in heading over one of the second distances is less than a second threshold angle, wherein the integer is selected such that the updated current heading best matches the heading of navigation device travel indicated by the obtained angular information;
      determine a current location of the navigation device based on the current heading and a distance travelled by the navigation device indicated by the obtained distance information;
      and determine when the structure has been exited, and wherein the navigation device, upon the determination of exiting structure by the DRN module, is operable to:
      output navigation information using at least one of a display and a speaker of the navigation device based on the determined current location.

2. The navigation device of claim 1, wherein the current heading of navigation device travel is selected as the reference heading plus/minus the best matching integer multiple of the lock angle.

3. The navigation device of claim 1, wherein the lock angle is an integer division of 90°.

4. The navigation device of claim 1, wherein the current heading of navigation device travel is not determined by the DRN module when the change in heading over the second distance of travel is greater than the threshold angle.

5. The navigation device of claim 1, wherein the DRN module is arranged to determine a current location of the navigation device based on the current heading and a distance travelled by the navigation device.

6. The navigation device of claim 1, wherein the DRN module is arranged to perform the method responsive to determining that a current location of the navigation device corresponds to a location having an internal roadway.

7. The navigation device of claim 6, wherein the location having the internal roadway is a parking structure.

8. The navigation device of claim 1, wherein the processor of the navigation device further determines based of a current location whether dead-reckoning navigation is needed.

9. The navigation device of claim 8, wherein the determination of whether dead-reckoning navigation is needed is based at least in part on the current location being in an area of low navigation signal reception.

10. The navigation device of claim 8, wherein the determination of whether dead-reckoning navigation is needed is based at least in part on map data accessible by the navigation device.

11. The navigation device of claim 1, wherein the navigation device further provides navigation information or navigation instructions via the display and/or the speaker.

12. A processor implemented method of determining a heading of travel of a navigation device using a dead reckoning navigation (DRN) module, comprising:
   determining when a structure has been entered, wherein upon the determination of entering the structure, the method further comprising:
   obtaining, by the DRN module, angular information relating to a heading of navigation device travel; and
   obtaining, by the DRN module, distance information relating to a distance travelled by the navigation device;
   determining, by the DRN module, a current location determine a reference heading for a roadway system having a grid layout in the structure based on a direction of navigation device travel for a first distance in response to a determination that a change in heading over the first distance is less than a first threshold angle;
   setting, by the DRN module, a current heading of navigation device travel as equal to the determined reference heading;
   determining, by the DRN module, a change in heading of navigation device travel over each of one or more second distances travelled by the navigation device, said second distance being less than the first distance;
   updating, by the DRN module, the current heading of navigation device travel as an integer multiple of a predetermined lock angle in combination with the reference heading in response to a determination that the change in heading over one of the second distances is less than a second threshold angle, wherein the integer is selected such that the updated current heading best matches the heading of navigation device travel indicated by the obtained angular information;
   determining, by the DRN module, a current location of the navigation device based on the current heading and a distance travelled by the navigation device indicated by the obtained distance information; and
   determining when a structure has been exited, and wherein upon the determination of exiting the structure, the method further comprising:
   outputting navigation information using at least one of a display and a speaker of the navigation device based on the determined current location.

13. The method of claim 12, wherein determining the current heading of navigation device travel as the reference heading plus/minus the best matching integer multiple of the lock angle.

14. The method of claim 12, wherein the lock angle is an integer division of 90°.

15. The method of claim 12, comprising not determining the current heading of navigation device travel when the change in heading over the second distance of travel is greater than the threshold angle.

16. The method of claim 12, comprising determining a current location of the navigation device based on the current heading and a distance travelled by the navigation device.

17. The method of claim 12, comprising performing the method responsive to determining that a current location of the navigation device corresponds to a location having an internal roadway system.

18. A non-transitory computer readable medium comprising computer software operable, when executed by a processor, to perform a method of determining a heading of travel of a navigation device using a dead reckoning navigation (DRN) module comprising:
   determining when a structure has been entered, wherein upon the determination of entering the structure, the method further comprising:
   obtaining angular information relating to a heading of navigation device travel; and
   obtaining distance information relating to a distance travelled by the navigation device;
   determining a reference heading for a roadway system having a grid layout in the structure based on a direction of navigation device travel for a first distance in response to a determination that a change in heading over the first distance is less than a first threshold angle;
   setting a current heading of navigation device travel as equal to the determined reference heading;
   determining a change in heading of navigation device travel over each of one or more second distances travelled by the navigation device, said second distance being less than the first distance;
   updating the current heading of navigation device travel as an integer multiple of a predetermined lock angle in combination with the reference heading in response to a determination that the change in heading over one of the second distances is less than a second threshold angle, wherein the integer is selected such that the updated current heading best matches the heading of navigation device travel indicated by the obtained angular information;
   determining a current location of the navigation device based on the current heading and a distance travelled by the navigation device indicated by the obtained distance information; and
   determining when the structure has been exited, wherein upon the determination of exiting the structure, the method further comprising:
   outputting navigation information using at least one of a display and a speaker of the navigation device based on the determined current location.

* * * * *